(12) United States Patent
Peschke

(10) Patent No.: US 7,276,960 B2
(45) Date of Patent: Oct. 2, 2007

(54) VOLTAGE REGULATED CHARGE PUMP WITH REGULATED CHARGE CURRENT INTO THE FLYING CAPACITOR

(75) Inventor: Carlo Eberhard Peschke, Kirchheim/Teck-Nabern (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 108 days.

(21) Appl. No.: 11/190,630

(22) Filed: Jul. 27, 2005

(65) Prior Publication Data
US 2007/0013434 A1 Jan. 18, 2007

(30) Foreign Application Priority Data
Jul. 18, 2005  (EP)  ................... 05392009

(51) Int. Cl.
G05F 3/02 (2006.01)
G05F 3/26 (2006.01)
G05F 3/28 (2006.01)
H02M 3/18 (2006.01)

(52) U.S. Cl. ................ 327/536; 327/537; 363/59; 363/60

(58) Field of Classification Search ........ 327/536, 327/537; 363/59, 60
See application file for complete search history.

(56) References Cited

U.S. PATENT DOCUMENTS

| | | | |
|---|---|---|---|
| 6,169,444 B1 * | 1/2001 | Thurber, Jr. ............ 327/536 |
| 6,438,005 B1 * | 8/2002 | Walter .................... 363/60 |
| 6,469,914 B1 * | 10/2002 | Hwang et al. ........... 363/21.01 |
| 6,618,296 B2 | 9/2003 | Zhang ................ 365/189.09 |
| 6,756,838 B1 | 6/2004 | Wu et al. ................. 327/536 |
| 6,774,710 B2 | 8/2004 | Li ........................... 327/536 |
| 6,794,926 B2 | 9/2004 | Rader et al. ............. 327/536 |
| 6,794,927 B2 | 9/2004 | Bedarida et al. ........ 327/536 |
| 6,801,078 B2 | 10/2004 | Allum ..................... 327/536 |
| 2004/0080361 A1 * | 4/2004 | Henry ..................... 327/536 |

FOREIGN PATENT DOCUMENTS

JP  2001112239 A  * 4/2001

* cited by examiner

Primary Examiner—Linh My Nguyen
Assistant Examiner—Colleen O'Toole
(74) Attorney, Agent, or Firm—Saile Ackerman LLC; Stephen B. Ackerman

(57) ABSTRACT

A charge pump circuit with a regulated charge current where the amount of current flowing into the flying capacitor depends on the magnitude of the output voltage error, using an OTA to convert the output voltage error into a current. Thus the flying capacitor is not charged when the output load is very low or when the output voltage error is minimal. Voltage overshoots are reduced by a stop circuit which forces pulse skipping and which inhibits the charging of the flying capacitor. Current limiting devices further limit the charge current into the flying capacitor. Full short-circuit protection is provided in one preferred embodiment by current limiting the driver stage of the charge pump circuit. Except for pulse skipping, the charge pump runs at a constant frequency supplied by a clock.

20 Claims, 2 Drawing Sheets

VOLTAGE REGULATED CHARGE PUMP WITH REGULATED CHARGE CURRENT INTO THE FLYING CAPACITOR

BACKGROUND OF THE INVENTION

1. Field of the Invention

The invention relates to charge pump circuits with a flying capacitor, and more particularly to the use of a flying capacitor which is charged as a function of the output voltage error.

2. Description of the Related Art

Portable electronic devices such as cellular phones, personal digital assistants, portable MP3 player and laptops are invariably powered by batteries which may be rechargeable or non-rechargeable. All of these batteries lose their charge over time, and therefore do not produce a single constant voltage output. One device for providing a regulated voltage supply independent of the battery output voltage is a charge pump. Charge pumps are DC-to-DC converters which utilize capacitors instead of inductors or transformers for energy storage. Such charge pumps typically make use of a "flying capacitor" which is charged from the battery during one cycle and pumped up, thereby raising its output voltage, during another cycle. The charge stored during the charging cycle is then transferred into a storage capacitor during the pump cycle.

Related art regulated charge pumps charge the flying capacitor up to the input voltage producing excessive overshoot and ripple at the output terminal of the charge pump circuit. These regulated charge pumps regulate the output voltage by changing the switching frequency. A big output capacitor is therefore required to reduce the overshoot and ripple of the output voltage because the entire excess charge of the flying capacitor will be transferred to the output capacitor in each switching period. The excess is the charge which causes the voltage of the flying capacitor to be higher than the output voltage minus the input voltage.

Related Art U.S. Patents are described next:

U.S. Pat. No. 6,801,078 (Allum) discloses a voltage multiplier circuit for programmable memories. It further utilizes a voltage feedback regulator which provides a digital gating signal to a multiplexer.

U.S. Pat. No. 6,794,927 (Bedarida et al.) teaches the use of a regulated supply voltage with a modular arrangement of charge pumps. The desired output voltages are obtained by using combinatorial clock signals for charge pump stages.

U.S. Pat. No. 6,794,926 (Rader et al.) shows a charge pump comprising an input circuit, a switching circuit and a control circuit which receives its inputs from the switching circuit and input circuit, and controls the switching circuit. The switches of the switching circuit are selectively actuated to charge and discharge capacitors to provide a regulated output voltage.

U.S. Pat. No. 6,774,710 (Li) describes a high precision charge pump circuit which compares the output feedback voltage with a reference voltage. In response to the comparison the clock frequency is either increased or decreased.

U.S. Pat. No. 6,756,838 (Wu et al.) presents a charge pump voltage regulator involving a load current and a clamp current. The two currents are compared and the charge pump current is then adjusted by stepping the frequency of the clock driving the charge pump.

U.S. Pat. No. 6,618,296 (Zhang) discloses a charge pump circuit for controlling the charging current via current limiting devices in a dual phase charge pump circuit. Supply current peaks that occur when the flying capacitor is charged are limited, thus reducing the noise on the supply.

It should be noted that none of the above-cited examples of the related art provide a current into the flying capacitor which is a function of the output voltage error, where the output voltage error is the desired (nominal) output voltage minus the actual output voltage. In addition the present invention utilizes a fixed frequency, in the first embodiment, or a very low frequency, in the second embodiment, and avoids frequencies ranging from audio frequencies to Megahertz frequencies. The present invention also limits the current to the output terminal to avoid short circuits. Additionally, the present invention provides currents of 100 mA at the output terminal using an external capacitor.

SUMMARY OF THE INVENTION

It is an object of at least one embodiment of the present invention to provide a method and a circuit which offers a voltage regulated charge pump and a regulated charge current.

It is another object of the present invention to reduce the voltage overshoot and ripple at the output of the charge pump.

It is yet another object of the present invention to control the amount of charge received by the flying capacitor.

It is still another object of the present invention to prevent a voltage overshoot at the output terminal of the pump circuit.

It is a further object of the present invention to provide full short-circuit protection for the output terminal It is yet a further object of the present invention to eliminate charging of the flying capacitor to the supply voltage if not necessary, i.e., when the actual output voltage is equal to the desired (nominal) output voltage.

It is still a further object of the present invention to reduce the size of the output capacitor over the related art.

These and many other objects have been achieved by making the current into the flying capacitor a function of the output voltage error i.e., the current into the flying capacitor is not fixed but variable. This is achieved by an operational transconductance amplifier (OTA) which converts the output voltage error into a corresponding current which controls the current to the flying capacitor. The voltage overshoot and ripple are reduced by not charging the flying capacitor to the input voltage ($V_{DD}$) when not necessary, that is when the actual output voltage is equal to the desired (nominal) output voltage. In one embodiment of the invention, overshoot can be further reduced by pulse skipping that is inhibiting the clock and thereby the charging of the flying capacitor. During charging of the flying capacitor the current is limited by current mirrors which are coupled between the OTA output and the flying capacitor. In another embodiment of the invention, full short-circuit protection can be provided by current limiting the driver stage of the charge pump circuit. When there is an output voltage overshoot, that is when the actual output voltage is too high, pumping of the flying capacitor means is also inhibited by a stop circuit, which receives one of its inputs from the OTA output, and which stops the charge pump circuit from pumping the flying capacitor. The charge pump runs at a constant frequency except at very low output loads (if the pulse skipping feature is implemented). At very low loads the output voltage error is negative because the actual output voltage is higher than the desired (nominal) output voltage. This results in a negative OTA output current, (i.e., the current flowing into the output of the OTA) which triggers the stop circuit. The present invention allows a reduction of the size of the output capacitor because it avoids the transfer in each period of excess charges from the flying capacitor to the output capacitor as just detailed.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

Use of the same reference number in different FIGS. indicates similar or like elements.

DESCRIPTION OF THE PREFERRED EMBODIMENT

Figure 1:
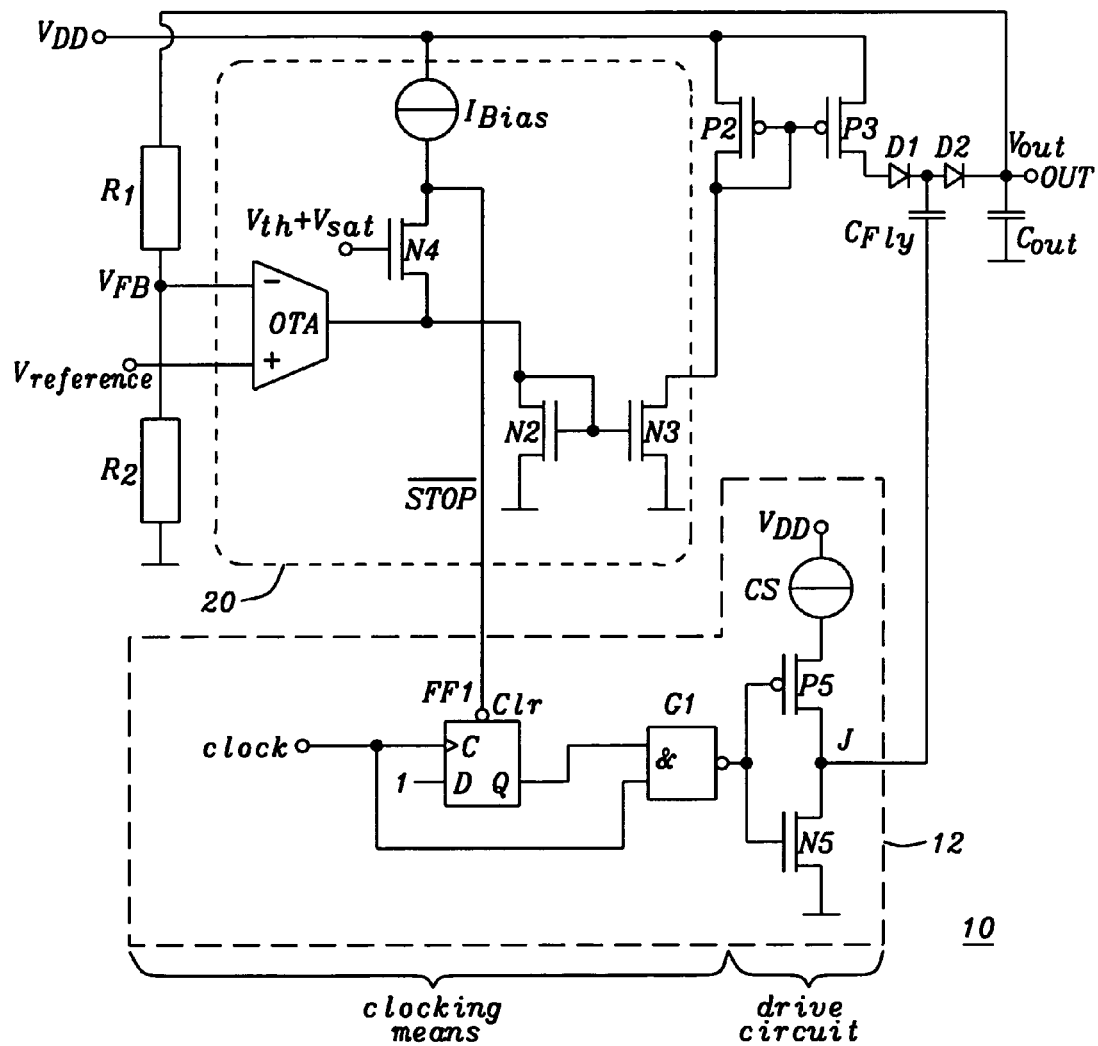
FIG. 1 is a circuit diagram of the present invention.

With reference to FIG. 1, we now describe the major characteristics of the preferred embodiment of the present invention and resulting benefits:

The charge pump runs at a constant frequency, except at very low loads if pulse skipping is implemented as another preferred embodiment. This will be further discussed below.

Because the flying capacitor is not charged to the input voltage if not necessary, the overshoot and ripple are lower.

Overshoot and ripple are further reduced by pulse skipping (in which case the frequency will no longer be constant).

During charging of the flying capacitor the current is limited, thereby providing short-circuit protection for the output and minimizing current pulses on the voltage supply.

Additionally, a current source for the discharging of the flying capacitor can be implemented for full short-circuit protection by limiting the current through transistor P5.

Still referring to FIG. 1, we now provide a detailed description of the voltage regulated charge pump 10 of the present invention. A voltage divider, shown here by way of example as comprising resistive means R1 and R2 in series, is coupled between output terminal OUT and the negative voltage rail of the charge pump circuit. A tap $V_{FB}$ provides a feedback voltage proportional to the output voltage $V_{out}$ at output terminal OUT.

The minus input of the operational transconductance amplifier (OTA) is coupled to tap $V_{FB}$ and the plus input is coupled to a reference voltage ($V_{reference}$). $V_{reference}$ typically comes from a bandgap reference circuit and is about 1.25V, but can be any other stable voltage. The OTA converts the difference between the voltages applied to the minus and plus inputs to a proportional charge current, where the difference between the voltages applied to the minus and plus inputs represents the difference between the desired output voltage (nominal voltage) and the actual output voltage at the output terminal OUT, respectively, of the charge pump circuit 10.

Two serially coupled current mirrors provide a mirrored current of the charge current. The input of the first current mirror (NMOS transistors N2, N3) is coupled to the output of the OTA and the output of the second current mirror (PMOS transistors P2, P3) is coupled via diode D1 to the first (or top) plate of flying capacitor $C_{FLY}$. Current mirrors are shown here by way of example, however other circuits such as a current amplifier can be used equally well. The output current of the second current mirror is fed into the flying capacitor during the charging phase.

A stop circuit comprises a current bias means $I_{Bias}$ in series with NMOS transistor N4 and is coupled between the positive voltage rail and the output of the OTA (please refer to FIG. 1). The stop circuit provides a stop signal STOP (read "STOP bar" i.e., the stop signal is active when negative). When the actual output voltage is larger than the desired voltage, that is when the output voltage is too high, the output current of the OTA goes negative and turns on NMOS transistor N4. This causes the drain of N4 to go negative, thereby issuing the stop signal. In the illustrative example of the stop circuit the control gate of N4 is coupled to a signal comprising the sum of a transistor threshold and transistor saturation voltage ($V_{th}+V_{sat}$) of transistor N4 at the drain current $I_{Bias}$.

Charge pump 12, comprising clocking means and a drive circuit, is coupled to a clock input CLOCK and the stop signal STOP. Charge pump 12 provides at its output terminal J a stepped waveform cycling between the voltage of the positive and negative voltage rail. The clocking means further comprises a Flip-Flop FF1 and a logic NAND gate G1, where the C input is coupled to clock input CLOCK, where the Clr input is coupled to the stop signal STOP, where the D input is tied to a logical "1", and an output Q which alternates its state with every clock input. The stop signal freezes the output of Flip-Flop FF1 to "low". The first input of logic NAND gate G1 is coupled to output Q and the second input is coupled to the clock input CLOCK. Flip-Flop FF1 and NAND gate G1 make sure that the clock restarts at an edge of the clock input CLOCK to avoid glitches.

The drive circuit comprises a CMOS driver with NMOS transistor N5 and PMOS transistor P5. In another preferred embodiment of the present invention a current limiting circuit, typically in the form of a current source CS, is coupled serially between the positive rail $V_{DD}$ and transistor P5 for full circuit protection. Junction J between N5 and P5 serves as the output terminal of the drive circuit.

The second (or bottom) plate of flying capacitor $C_{FLY}$ is coupled to the output terminal of the charge pump, where the second plate gets pumped when the voltage of the stepped waveform at junction J jumps to near the level of the positive voltage rail, thereby raising the potential of the charge at said first plate. When the voltage at junction J falls to near the level of the negative voltage rail, flying capacitor $C_{FLY}$ can be charged by the current mirrors.

Output capacitive means $C_{out}$ is coupled between output terminal OUT and the negative voltage rail. The plate of $C_{out}$ coupled to output terminal OUT is also coupled to the first plate of $C_{FLY}$ via a second diode D2. $C_{out}$ stores the charges received from $C_{FLY}$ when $C_{FLY}$ is pumped. $C_{out}$ supplies the output voltage $V_{out}$ (actual output voltage) at output terminal OUT and further reduces ripples.

Figure 2:
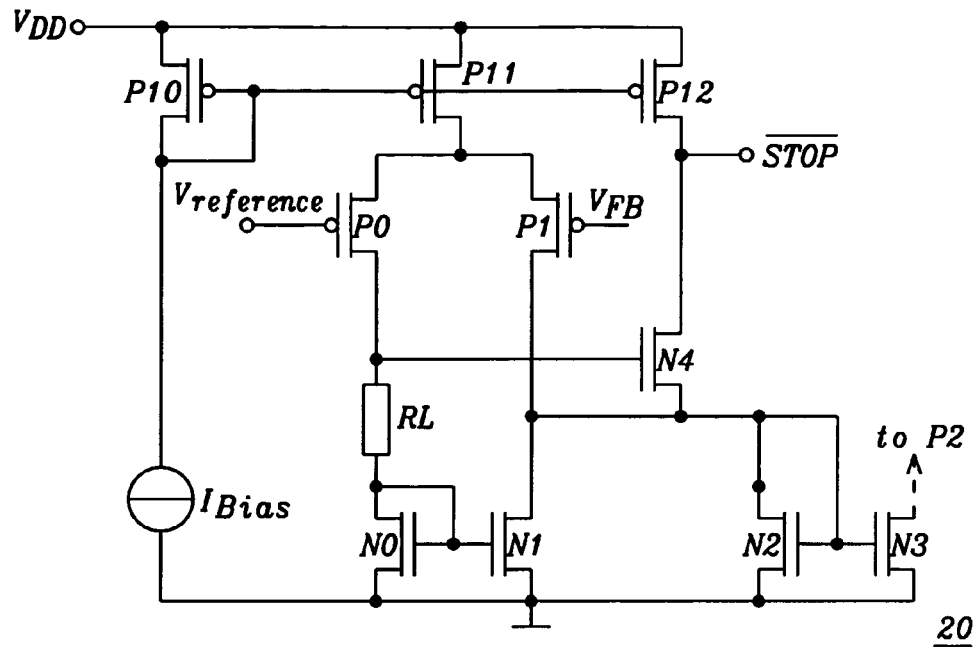
FIG. 2 is a more detailed circuit diagram of the OTA and the signaling circuit of FIG. 1

We now direct our attention to FIG. 2 which in circuit 20 shows in greater detail the OTA circuit and the stop circuit. $V_{reference}$ and $V_{FB}$ are the inputs to differential PMOS transistor pair P0 and P1, respectively. Their sources are coupled via current mirror PMOS transistors P10, P11 to $V_{DD}$.

Current source transistor P10 receives its current from current reference $I_{Bias}$. P0 is coupled via a resistive means RL to current source transistor N0. P1 is coupled to current source transistor N1. NMOS transistor N4 is coupled between PMOS current source P12 and NMOS current source N2. The gate of N4 is coupled to the junction of P0 and RL. The value of RL is chosen so that at the gate of N4 is a voltage $V_{th}+V_{sat}$ above ground. Elements previously discussed are indicated by like numerals and need not be described further.

Figure 3:
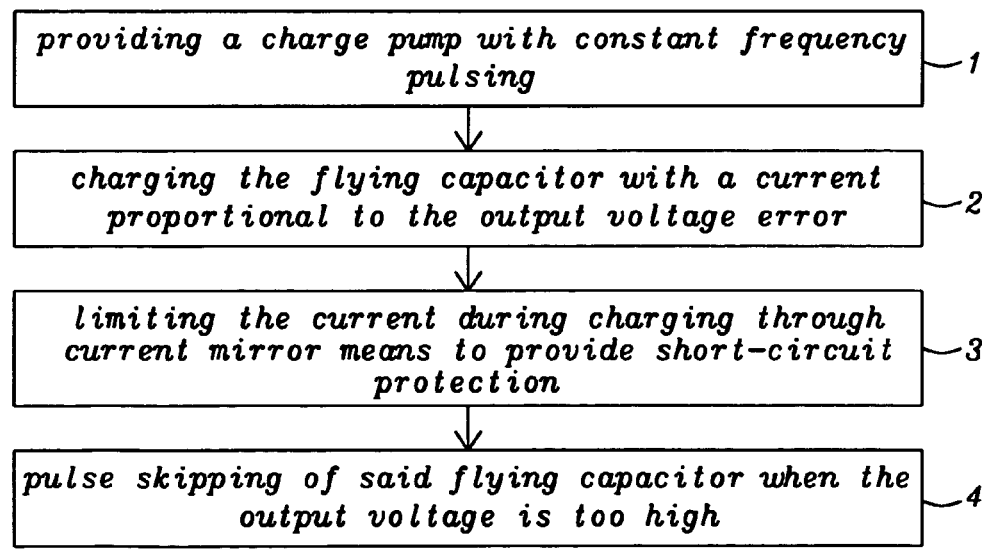
FIG. 3 is a block diagram of the method of the invention.

Referring now to FIG. 3, we discuss the method of the invention of regulating the voltage of a charge pump:

Block 1 describes providing a charge pump with constant frequency pulsing;

Block 2 describes charging the flying capacitor with a current proportional to the output voltage error;

Block 3 describes limiting the current during charging through current mirror means to provide short-circuit protection;

Block 4 describes pulse skipping of said flying capacitor when the output voltage is too high.

While the invention has been particularly shown and described with reference to the preferred embodiments thereof, it will be understood by those skilled in the art that various changes in form and details may be made without departing from the spirit and scope of the invention.

What is claimed is:

1. A voltage regulated charge pump circuit, comprising:
an amplifier means to convert an output voltage error at an output terminal of a charge pump circuit into a charge current, where said charge current is a function of said output voltage error;
   current amplifying means coupled to an output of said amplifier means to mirror said charge current into a first plate of a flying capacitor means, thereby charging said flying capacitor means;
   a charge pump running at a constant frequency, coupled between a clock input and a second plate of said flying capacitor means to pump said flying capacitor means when said output voltage error indicates an under-voltage condition, where said charge pump upon receiving an inhibiting signal is inhibited from pumping said flying capacitor means when said output voltage error indicates an over-voltage condition, and where a signaling circuit driven by said output of said amplifier means issues said inhibiting signal;
   said signaling circuit comprising switching means where the control pate of said switching means is coupled to a signal comprising the sum of a transistor threshold voltage and transistor saturation voltage; and
   said output terminal in communication with said first plate of said flying capacitor means to provide an output voltage.

2. The charge pump circuit of claim 1, wherein said output voltage error is the difference between the desired output voltage at said output terminal and the actual output voltage at said output terminal.

3. The charge pump circuit of claim 1, wherein charging of said flying capacitor means stops when there is no output voltage error.

4. The charge pump circuit of claim 1, wherein said current amplifying means limits the charge current into said flying capacitor means.

5. The charge pump circuit of claim 1, wherein a clock circuit, coupled between a clock input and said charge pump, controls when said charge pump pumps said flying capacitor means.

6. A voltage regulated charge pump circuit, comprising:
an operational transconductance amplifier to convert an output voltage error at an output terminal of a charge pump circuit into a charge current as a function of said output voltage error, where said output voltage error is the difference between the desired output voltage and the actual output voltage at said output terminal;
   current amplifying means coupled to an output of said operational transconductance amplifier to mirror said charge current into a first plate of a flying capacitor means, thereby charging said flying capacitor means;
   a charge pump in communication with an output of said operational transconductance amplifier and a second plate of said flying capacitor means to pump said flying capacitor means when said output voltage error indicates an under-voltage condition, where said charge pump upon receiving an inhibiting signal is inhibited from pumping said flying capacitor means when said output voltage error indicates an over-voltage condition, and where a signaling circuit, driven by said output of said operational transconductance amplifier, issues said inhibiting signal;
   said signaling circuit comprising switching means where the control gate of said switching means is coupled to a signal comprising the sum of a transistor threshold voltage and transistor saturation voltage;
   clocking means coupled in series between said output of said operational transconductance amplifier and said charge pump to control the frequency at which said flying capacitor means is pumped; and
   output capacitive means in communication with said first plate of said flying capacitor means and said output terminal, said output capacitive means storing charges received from said flying capacitor means.

7. The charge pump circuit of claim 6, wherein said charge pump runs at a constant frequency.

8. The charge pump circuit of claim 6, wherein charging of said flying capacitor means stops when there is no output voltage error.

9. The charge pump circuit of claim 6, wherein said current amplifying means limits the charge current into said flying capacitor means during charging.

10. The charge pump circuit of claim 6, wherein a clock input to said clocking means controls when said charge pump pumps said flying capacitor means.

11. A voltage regulated charge pump circuit, comprising:
a voltage divider coupled between an output terminal and a negative voltage rail of the charge pump circuit, said voltage divider providing a feedback voltage proportional to the voltage of said output terminal;
   an operational transconductance amplifier with a first and a second input and an output, where said first input is coupled to said feedback voltage and the second input is coupled to a reference voltage, said operational transconductance amplifier converting the difference between the voltages applied to said first and second input to a proportional charge current, where the difference between said voltages applied to said first and second input represents the difference between the desired output voltage and the actual output voltage at said output terminal of said charge pump circuit;
   serially coupled current mirrors, where the input of the first current mirror is coupled to said output of said operational transconductance amplifier, where the output of the last current mirror provides a mirrored current of said charge current;

a stop circuit, comprising a current bias means coupled in series with switching means between a positive voltage rail and said output of said operational transconductance amplifier, to provide a stop signal when said actual output voltage is larger than said desired voltage, where the control gate of said switching means is coupled to a signal comprising the sum of a transistor threshold and transistor saturation voltage;

a charge pump comprising clocking means and a drive circuit, said charge pump coupled to a clock input and said stop signal, said charge pump providing at its output terminal a stepped waveform cycling between the voltage of said positive and negative voltage rail;

a flying capacitor means with a first and a second plate, said first plate coupled to the output of said last current mirror, said first plate getting charged when the voltage of said stepped waveform is at said negative voltage rail, said second plate coupled to said output of said charge pump, where said second plate gets pumped when the voltage of said stepped waveform jumps to said positive voltage rail, thereby raising the potential of the charge at said first plate; and output capacitive means in communication with said first plate of said flying capacitor means and said output terminal of said charge pump circuit, said output capacitive means storing charges received from said flying capacitor means when pumped.

12. The charge pump circuit of claim 11, wherein said charge pump further comprises:

Flip-Flop means with inputs coupled to said clock input and said stop signal, respectively, and an output which alternates its state with every clock input, where said stop signal freezes the output of said Flip-Flop means;

a logic gate, its inputs coupled to said clock input and said output of said Flip-Flop means, respectively, where the output of said logic gate ensures that the clock restarts at an edge of said clock input; and said drive circuit comprising complimentary switching means coupled between said positive and negative voltage rails, where the junction of said complimentary switching means is coupled to said second plate of said flying capacitor means.

13. The charge pump circuit of claim 11, wherein said flying capacitor means is not charged if there is no output voltage error.

14. The charge pump circuit of claim 11, wherein said charge pump charges said flying capacitor means at a constant frequency.

15. The charge pump circuit of claim 11, wherein said charge pump skips charging said flying capacitor means when said stop signal is received.

16. The charge pump circuit of claim 11, wherein charging of said flying capacitor means stops when there is no output voltage error.

17. The charge pump circuit of claim 11, wherein a current limiting means is coupled in series with said complimentary switching means to provide short circuit protection for said output terminal of said charge pump circuit.

18. The method of regulating the voltage of a charge pump, comprising the steps of:

a) providing a charge pump with constant frequency pulsing;

b) charging the flying capacitor with a current proportional to the output voltage error;

c) limiting the current during charging through current mirror means to provide short-circuit protection;

d) pulse skipping of said flying capacitor when the output voltage is too high; and e) controlling pulse skipping through a signal comprising the sum of a transistor threshold and a transistor saturation voltage.

19. The method of claim 18, wherein said output voltage error is the difference between the desired output voltage at an output terminal and the actual output voltage at said output terminal.

20. The method of claim 18, wherein charging of said flying capacitor means stops when the desired output voltage is reached.

* * * * *